United States Patent [19]
Atmur et al.

[11] Patent Number: 5,857,550
[45] Date of Patent: *Jan. 12, 1999

[54] POLYMER DERIVED FIBER REINFORCED CERAMIC MATRIX COMPOSITE CLUTCH

[75] Inventors: Steven Donald Atmur, Riverside; Thomas Edward Strasser, Corona; William Scott Richardson, Anaheim Hills, all of Calif.

[73] Assignee: Northrop Grumman Corporation, Los Angeles, Calif.

[*] Notice: The term of this patent shall not extend beyond the expiration date of Pat. No. 5,560,455.

[21] Appl. No.: 704,468

[22] Filed: Aug. 28, 1996

[51] Int. Cl.⁶ ..................................................... F16D 11/00
[52] U.S. Cl. ..................................................... 192/107 M
[58] Field of Search .................. 192/107 M; 188/251 A, 188/251 M

[56] References Cited

U.S. PATENT DOCUMENTS

| | | |
|---|---|---|
| 4,606,434 | 8/1986 | Vasilow et al. . |
| 4,657,951 | 4/1987 | Takarada et al. . |
| 4,808,275 | 2/1989 | Ohzora et al. . |
| 5,325,941 | 7/1994 | Farinacci et al. . |
| 5,560,455 | 10/1996 | Atmur et al. ....................... 188/251 A |

*Primary Examiner*—Charles A. Marmor
*Assistant Examiner*—Saúl J. Rodríguez
*Attorney, Agent, or Firm*—Terry J. Anderson; Karl J. Hoch, Jr.

[57] ABSTRACT

A structural fiber reinforced ceramic matrix composite (FRCMC) material adapted for clutch use. The entirety of the frictional components of a clutch mechanism or only particular components thereof can be made of the FRCMC material. One embodiment has integrally molded fiber reinforced ceramic matrix composite clutch friction pads forming the friction surfaces of metal clutch parts. Clutch components exhibiting a higher temperature and wear-resistance than currently available clutch parts are described. These clutch components and pads exhibit improved performance at high temperatures and are highly wear-resistant in comparison to current clutch components.

42 Claims, 3 Drawing Sheets

POLYMER DERIVED FIBER REINFORCED CERAMIC MATRIX COMPOSITE CLUTCH

BACKGROUND OF THE INVENTION

1. Technical Field

This invention relates to clutches used on vehicles such as motorcycles, cars, busses, trucks, and trains as well as clutches used on heavy machinery or power generating equipment. More particularly, this invention relates to a structural fiber reinforced ceramic matrix composite (FRCMC) material adapted for clutch use for the entirety of components of a clutch system or for only particular components thereof. It also relates to integrally molding fiber reinforced ceramic matrix composite clutch friction pads attached to the surfaces of metal clutch parts.

2. Background Art

A clutch is used to provide transfer of rotational energy or torque from one motor or machine to another. The clutch also provides the ability to control that transfer of energy by enabling the operator to engage and disengage the clutch, and thereby provide control over the transfer of energy between the two devices. The torque transmitted is related to the actuating force, the coefficient of friction of the engaging surfaces, and to the geometry of the clutch. In addition, the lighter the component weight of the clutch components the less energy that is required to accelerate and decelerate the vehicle. Dry clutches, i.e. clutches that do not use lubricant, but use two dry materials rubbing against each other, are extremely popular ways of controlling machinery, such as industrial equipment, motorcycles, heavy trucks and automobiles. For example, vehicles with a manual transmission typically use a single dry plate, diaphragm spring type clutch as shown in FIG. 1. The clutch assembly comprises a pressure plate 6, a flywheel 4, and a clutch disk 8. Typically, the clutch disk 8 is connected via an input shaft 12 to the transmission 14 of the vehicle, while the pressure plate 6 and flywheel 4 are connected to the motor. The clutch disk 8 is trapped between the pressure plate 6 and the flywheel 4 when the clutch is engaged, thereby transferring rotational energy from the motor to the wheels through the transmission 14. The clutch disk 8 has a splined hub 18 which allows it to slide along the splines of the transmission input shaft 12. The clutch disk 8 is held in the engaged position by spring pressure exerted by a diaphragm spring in the pressure plate 6. The clutch assembly is disengaged by a clutch release system which includes a release bearing 16, typically activated via a clutch pedal (not shown). When pressure is applied to the clutch pedal to disengage the clutch, the release bearing 16 is pushed against the fingers of a diaphragm spring release mechanism 20, which in turn releases the clutch disk 8 from engagement with the pressure plate 6 and the flywheel 4.

Typically, the flywheel 4 and pressure plate 6 are made of cast iron, and the clutch disk 8 is constructed of annular organic or semi-metallic pads 22 attached to both sides of a metal disk. These pads 22 interface with the friction surfaces 10 of the pressure plate 6 and flywheel 4. Ideally, the pads 22 are made of a high friction material that resists deterioration and wear under the fairly high temperature conditions encountered when the clutch disk is engaged with the pressure plate 6 and flywheel 4. A material with a very high coefficient of friction used in the clutch components will result in the clutch engaging or locking up rapidly as the spring force is applied; a quality that is desirable in a clutch.

Over time, with the present technology, as the clutch is used, the clutch disk pads 22 tend to wear down, and the interfacing friction surfaces 10 of the pressure plate 6 and flywheel 4 become damaged (for example, scored, gauged and worn down). A primary wear-related fault which clutch mechanisms are prone to is clutch slip. Clutch slip is a self-evident condition which occurs when the clutch disk pads 22 are badly worn so that there is insufficient pressure from the pressure plate 6 when spring pressure is applied to ensure solid engagement of the clutch mechanism. The cure for clutch slip is to renew the clutch disk 8 or the clutch pads 22, and possibly resurface the pressure plate and the flywheel friction surfaces 10. Therefore, the clutch disk 8 or the clutch friction pads 22 have to be replaced often and the flywheel 4 and pressure plate 6 have to be resurfaced or replaced periodically to ensure an adequate transfer of energy required to engage and disengage the clutch. Since most of the components of the present clutch system are made of cast iron, which is heavy, a relatively high rotational inertia exists which increases the required energy to accelerate and decelerate the engine and vehicle. Additionally, the clutch disk 8, pressure plate 6 and flywheel 4 tend to spin against one another when the clutch is engaged and disengaged, resulting in a temperature rise which contributes to wear and damage of these parts, and can also reduce the coefficient of friction, thereby decreasing the efficiency of the clutch and its ability to lock up immediately. This reduced efficiency can cause slipping, leading to even more wear damage.

To prevent the common clutch problems, car, motorcycle, truck, train, and other machinery applications could utilize a better clutch system than is provided by current technology. Ideally, this improved clutch would be constructed of material that is lighter, longer wearing, and has a higher friction coefficient and friction stability over a wide temperature range, hence providing a longer life and improved performance over the present technology.

Wherefore, it is an object of this invention to provide a lightweight clutch system for motorized vehicles, machines and the like.

It is another object of this invention to provide a clutch component material that is resistant to damage in any application involving high frictional forces and high temperatures.

It is still another object of this invention to provide clutch components for motorized vehicles, machines, and the like, which have a high coefficient of friction at any temperature and which have a friction coefficient that is stable with increasing temperature.

Other objects and benefits of this invention will become apparent from the description which follows hereinafter when read in conjunction with the drawing figures which accompany it.

SUMMARY

The foregoing objects have been achieved by a high temperature and wear-resistant clutch assembly, which is light weight and has a high coefficient of friction. The clutch components are made of a structural fiber reinforced ceramic matrix composite (FRCMC) material having an erosion-resistant/friction-producing material disposed therein. The invention described herein is suitable for applications in vehicles such as motorcycles, cars, busses, trucks, trains as well as heavy machinery or power-generating equipment.

The clutch assembly has one or more clutch components which have friction surfaces made of the aforementioned FRCMC material. These interfacing surfaces interface with friction surfaces of other clutch components. The FRCMC material employed in the clutch assembly includes a polymer-derived ceramic resin preferably either from silicon-carboxyl resin or alumina silicate resin; and fibers comprised of alumina, Nextel 312, Nextel 440, Nextel 510, Nextel 550, silicon nitride, silicon carbide, HPZ, graphite, carbon, and/or peat fibers.

To achieve a tougher material, the fibers are coated with interface material thereby preventing the cured polymer-derived ceramic resin from adhering directly to the fibers in the ceramic state. The interface material can be one or more 0.1 to 5 microns thick layer(s) preferably of carbon, silicon nitride, silicon carbide, and/or boron nitride.

Up to about 60 percent by volume of the FRCMC material can be the aforementioned erosion-resistant/friction-producing material. This material is preferably made of alumina, mullite, silica, silicon carbide, titania, silicon nitride, boron nitride, or an equivalent material, or any combination thereof, up to a total volume of about 60 percent. The erosion-resistant/friction-producing material can be dispersed throughout the FRCMC material, or limited to those areas adjacent the frictional surfaces of the clutch component. Different combinations of the aforementioned erosion-resistant/friction-producing materials allow for tailoring of hardness and friction coefficients of the material.

If appropriate to the physiology of the fiber system, the fibers system adjacent to the friction surfaces of the clutch components can be placed so as to form circular arc segments and/or radial lines with respect to a center of rotation of a clutch component.

The clutch components could be made entirely of the FRCMC material described above or just the frictional interfacing surfaces could be made of these materials. If the latter method of manufacture is chosen, the component could take the form of a "pad" which would be attached to conventional metal clutch parts by riveting or adhesively bonding the "pad" thereto. As an alternate to riveting or adhesively bonding, the "pads" could also be integrally formed into the clutch components by placing them at the frictional interfaces of the clutch components within a mold and then pouring molten metal into the mold.

Since the FRCMC clutch components in accordance with the present invention have qualities that conventional clutch components do not have such as heat and wear/erosion-resistance under extreme temperatures, the clutch components made from above-described FRCMC clutch material have several advantages. The FRCMC clutch components are relatively light compared to conventional clutch materials such as cast iron, and the FRCMC clutch material provides a high friction coefficient to transfer loads efficiently. Also, since the FRCMC clutch components are harder and stronger than conventional clutch components, the life of the clutch assembly is increased. Additionally, the coefficient of friction of the FRCMC material is stable with increasing temperature. The proposed clutch can also be used in various configurations. In assembling various clutch configurations selected clutch components could be formed of the above-described FRCMC material, while others could be made of conventional materials. For example, just the clutch disk in the clutch mechanism could be formed of FRCMC material. This would allow for easy, low cost retrofit of current clutches. Alternately, either the pressure plate or flywheel or both could be made of this material.

DETAILED DESCRIPTION OF THE PREFERRED EMBODIMENTS OF THE INVENTION

Figure 1:
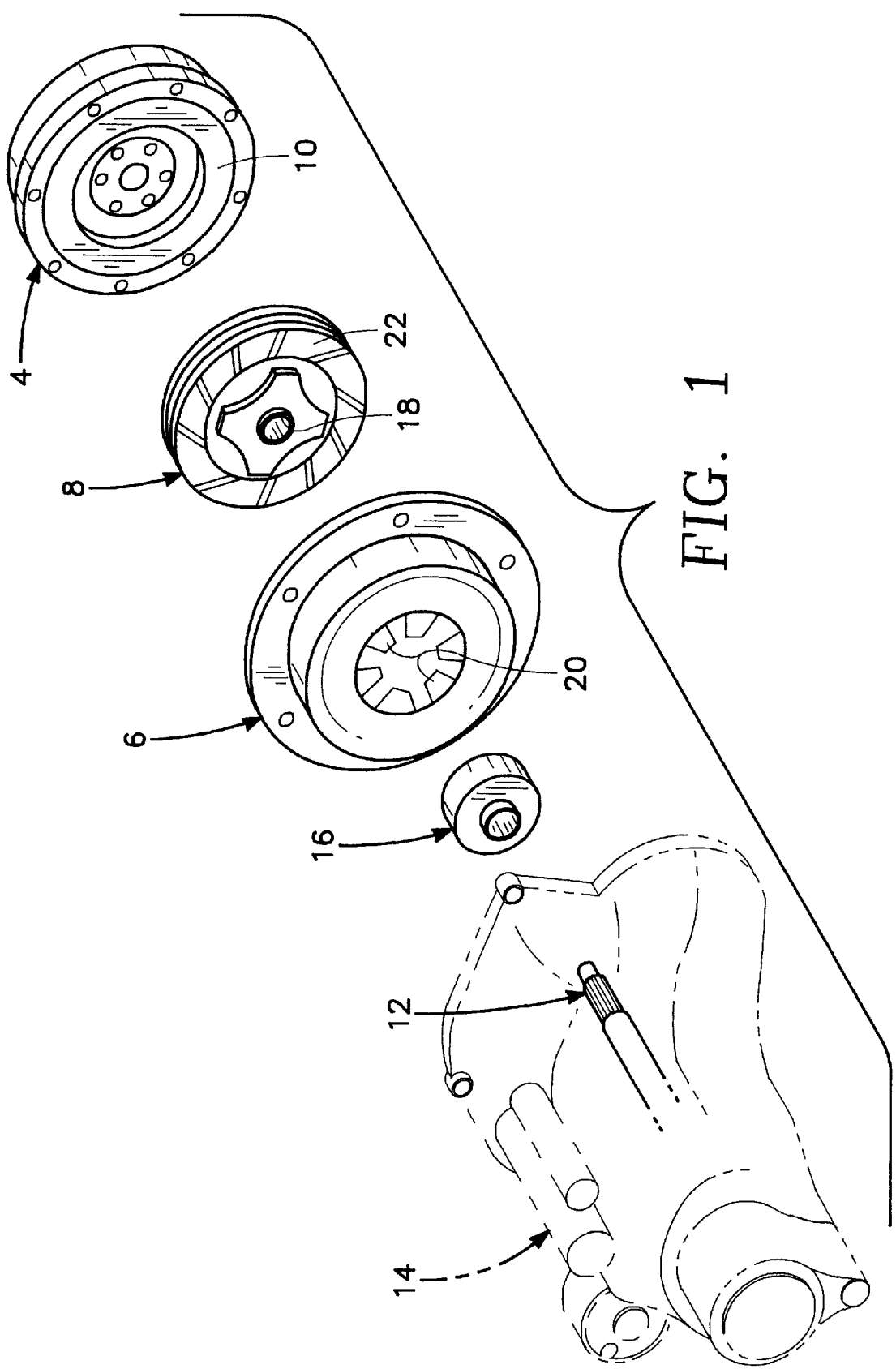
FIG. 1 is a perspective, exploded view of a typical clutch of the type used on automobiles.

The preferred materials, forming methods and preferred embodiments of the present invention shall be further discussed below in reference to the just-described drawings.

According to one aspect of the present invention, the parts of an automotive clutch are made of a structural fiber reinforced ceramic matrix composite (FRCMC) material modified specifically for clutch use. That is, the clutch material of this invention comprises a specially prepared FRCMC material which includes wear-resisting, friction-producing elements. Such a structural FRCMC material exhibits high breakage resistance and is particular suitable for use in parts for high temperature applications. The FRCMC material employs any of several polymer-derived ceramic resins which are commercially available, such as silicon-carboxyl resin (sold by Allied Signal under the trade name Blackglas) or alumina silicate resin (sold by Applied Poleramics under the product designation C02). The resin is combined with a fiber system employing fiber such as, but not limited to, alumina, Nextel 312, Nextel 440, Nextel 510, Nextel 550, silicon nitride, silicon carbide, HPZ, graphite, carbon, and/or peat. To accomplish the objectives of the invention, the fibers are first coated with a 0.1–5.0 micron thick layer of an interface material such as carbon, silicon nitride, silicon carbide, and/or boron nitride; or multiple layers of one or more of these interfacial materials. The interface material prevents the resin from adhering directly to the fibers of the fiber system. Thus, when the resin has been converted into a ceramic, there is a slight play between the ceramic and fibers imparting the desired breakage-resistant quality to the final FRCMC material.

An erosion-resistant, friction-inducing material is also mixed in with the resin/fiber mixture prior to part formation. This erosion-resistant/friction-inducing material, which is preferably in powder form, can be dispersed throughout the material. Up to about 60 percent by volume of the friction-inducing/erosion-resistant material can be used. This material is preferably alumina, mullite, silica, silicon carbide, titania, silicon nitride, boron nitride, or an equivalent material, or any combination thereof up to a total volume of about 60 percent. Alternatively, the erosion-resistant, friction-inducing material could be disposed solely adjacent the friction surfaces of the clutch components. This can be done during the initial mixing process or after the first or second "firing" via a conventional "SOL-GEL" technique. Different combinations of the aforementioned erosion-resistant/friction-inducing materials allow for flexibility in tailoring of hardness and friction coefficients of the clutch components, and thus provide a varying "feel" to the user. However, employing a total of approximately 30 percent by volume of alumina and/or silicon carbide is preferred.

Generally, the steps of constructing a clutch part comprise first coating the fibers of the fiber system with the above-described interface material, adding resin to the fibers, then mixing in the erosion-resistant, friction-inducing powder throughout the fiber-resin composite; forming the part; and firing the formed part at a temperature which will convert the resin into a ceramic.

More specifically, according to the preferred embodiment of the present invention, the clutch components are fabricated using the compression molding process described in a co-pending application entitled COMPRESSION/INJECTION MOLDING OF POLYMER-DERIVED FIBER REINFORCED CERAMIC MATRIX COMPOSITE MATERIALS having some of the same inventors as the present application and assigned to a common assignee. This co-pending application was filed on Aug. 28, 1996 and assigned Ser. No. 08/704348. The disclosure of this co-pending application is herein incorporated by reference. The following simplified process provides an example of using the aforementioned compression molding process to form the clutch components according to the present invention where the chosen pre-ceramic resin is the Blackglas resin:

1. The first step is to coat the fibers chosen for the clutch part with an interface material, such as the aforementioned carbon, silicon nitride, silicon carbide and/or boron nitride, in one 0.1–5 micron thick layer or multiple layers of one or more of these interfacial materials.

2. Next, the coated fiber system is mixed into a Blackglas resin preferably having a viscosity of about 10,000 centipoises so as to ensure movement of the coated fibers with the resin within the compression mold.

3. The erosion-resistant, friction-inducing material is then mixed in with the resin/fiber mixture prior to part formation. Preferably the erosion-resistant, friction-inducing material particles are dispersed throughout the mixture, although they could alternately be dispersed only adjacent the friction surfaces of the clutch component as discussed previously. This mixture can include up to about 60 percent by volume of alumina, mullite, silica, silicon carbide, titania, silicon nitride, boron nitride, or an equivalent material, or any combination thereof up to a total volume of about 60 percent. However, disposing a total of approximately 30 percent by volume of alumina and/or silicon carbide is preferred.

4. Next, the mixture is loaded into an appropriately shaped compression mold tool and squeezed under pressure in the mold to form the desired clutch component.

5. The molded clutch components are then heated within the mold per the following cycle (as recommended by the manufacturer of the Blackglas resin):

A) Ramp from ambient to 150° F. at 2.7°/minute
 B) Hold at 150° F. for 30 minutes
 C) Ramp at 1.7°/minute to 300° F.
 D) Hold at 300° F. for 60 minutes
 E) Cool at 1.2°/minute until temperature is below 140° F.

It should be noted that there are a variety of heat-up cycles which will create usable hardware and the foregoing is by way of one example only and not intended to be exclusive. This heating cycle polymerizes the resin. The clutch component is then in a "green state" similar to bisque-ware in ceramics, such that it does not have its full strength as yet, but can be handled.

6. The now polymerized composite clutch component is then pyrolized in an inert gas environment. In this regard, for example, a sealable container, such as a stainless steel box, capable of withstanding the temperatures required for the pyrolysis cycle can be employed to hold the component. This box should have two tubing connections, one on the bottom and one on the top to allow the box to be flooded with an inert gas. In this example, the clutch component is placed in the box, the box placed in a standard furnace, stainless steel tubing is connected to the lower connector on the box and to a supply of high purity argon. Any equivalent inert gas could, of course, be used. The argon is allowed to flow into the box, and out the top vent at a rate sufficient to ensure a volumetric environment change of 1–3 times per hour for the entire heat cycle, thus assuring the clutch component is totally enveloped in an inert environment. The furnace is closed and fired on the following basis (as recommended by the manufacturer of the Blackglas resin):

A) Ramp to 300° F. at 223°/hour
 B) Ramp to 900° F. at 43°/hour
 C) Ramp to 1400° F. at 20°/hour
 D) Ramp to 1600° F. at 50°/hour
 E) Hold at 1600° F. for 4 hours
 F) Ramp to 77° F. at −125°/hour Again, there are a variety of heating schedules other than this one, given by way of example only, which will yield usable hardware. In an alternative step, an inert gas furnace could be used if available, rather than the above described box.

7. Upon cooling, the clutch component is removed from the furnace (and box if used) and submerged in a bath of Blackglas resin for enough time to allow all air to be removed from the component (typically 5 minutes or more). A vacuum infiltration may also be used for this step. This fills any outgassed pores in the clutch component with the resin.

8. Steps 6 and 7 are then repeated until the remaining outgassed pores are below a desired level which imparts the maximum strength to the final FRCMC clutch component. Typically, it is preferred that this cycle be repeated five times. The clutch component is then ready for use.

The clutch components can also be initially formed using other methods applicable to polymer composite part formation such as resin transfer molding, hot pressing, tape or tow placement, or hand lay-up. However, it is not intended to limit the invention to any of the described methods. Rather any appropriate method may be employed to form the clutch components from the previously described FRCMC material.

Surface wear can be reduced by orienting the fibers adjacent the friction surfaces of the clutch component. For a rotating clutch system, it is preferred the fibers lie along circular arc segments or radial lines with respect to the rotational center of the part.

Because it has qualities that conventional clutch components do not have such as heat and wear/erosion-resistance under extreme temperatures, the clutch components made from above-described FRCMC clutch material have several advantages. The FRCMC clutch components are relatively light compared to conventional clutch materials such as cast iron, and hence require less energy to accelerate and decelerate the machine. Additionally, the FRCMC clutch assembly provides a high coefficient of friction to transfer loads efficiently. Also, the FRCMC clutch components are harder than presently used clutch parts, and thereby increase the life of the clutch assembly. Additionally, the FRCMC clutch exhibits a coefficient of friction that is stable with increasing temperature, and thus continues to provide substantial friction even at high temperatures.

A clutch according to the present invention can be used in various configurations. For example, FIGS. 2 A–B show various embodiments of a clutch assembly as used in a typical automobile or truck with a manual transmission where a single clutch disk is contained between the flywheel of the engine and a pressure plate.

Figure 2A:
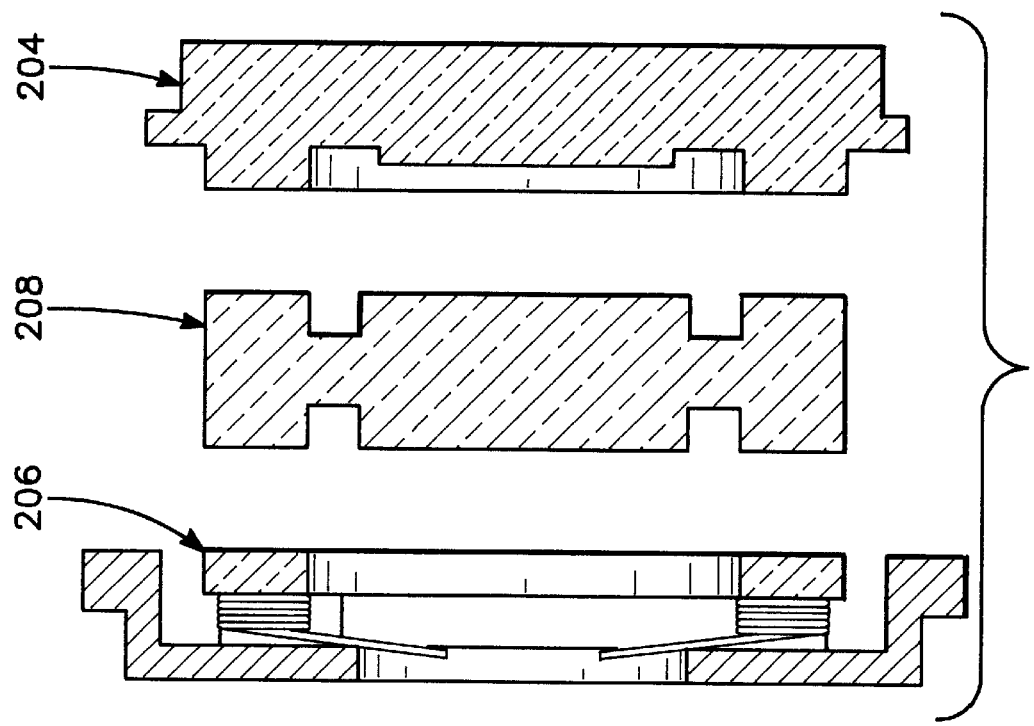
FIG. 2A provides a cross-sectional view of a FRCMC clutch disk made in accordance with the present invention disposed between a metal pressure plate and metal flywheel.

One such embodiment, shown in FIG. 2A, employs a clutch disk 108 made of the previously described FRCMC disposed between a metal flywheel 104 and pressure plate 106. This concept provides high friction to transfer large loads with minimal changes to a conventional vehicle (i.e. allowing easy retrofit)—however, since the clutch disk 108 is now harder than the metal surfaces in contact with it, the flywheel 104 and pressure plate 108 will wear out. This does not typically occur in current automotive clutches where the clutch disk pads are made of softer material than the pressure plate and flywheel. However, the life of the clutch assembly should be substantially longer than a modern-day organic or semi-metallic based clutch disk.

Figure 2B:
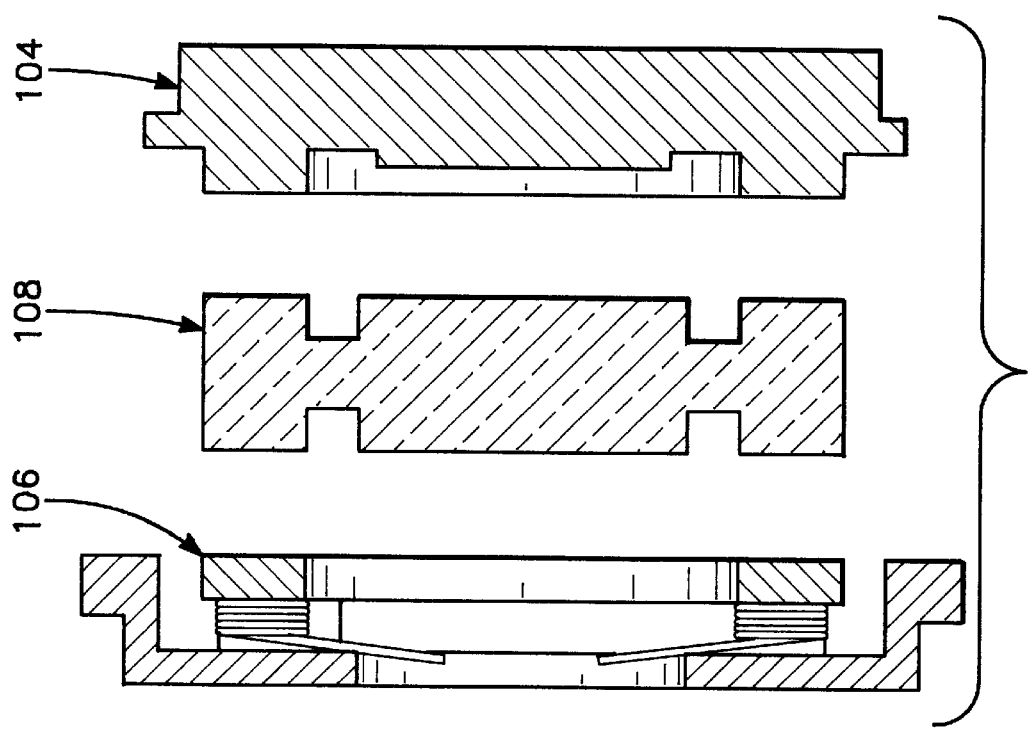
FIG. 2B provides a cross-sectional view of clutch having the clutch disk as well as the flywheel and pressure plate made of FRCMC material.

In another embodiment, shown in FIG. 2B, the same FRCMC clutch disk 208 is disposed between the surfaces of the flywheel 204 and the pressure plate 206, which are now made from the FRCMC material, as well. In this version of the invention both the flywheel 204 and the pressure plate 206 are now made from the FRCMC. This provides two major benefits to the typical automotive system. First, the FRCMC is lighter than metal so there will be a reduction in component weight which results in a reduced rotational inertia of the system. This reduces the required energy to accelerate and decelerate the engine and vehicle. Second, both of the engaging surfaces in contact with the FRCMC clutch disk 208 will also be made of the FRCMC material, thus the wear at the interface will be reduced and the life of the clutch assembly will be increased. The cost of retrofitting existing vehicles may be more for this embodiment. However, this increased cost can be justified by the increased life and enhanced efficiency of the clutch. This type of assembly could be particularly useful in trucks or heavy industrial equipment where extremely long life is desired. Of course, it would also be possible to employ the FRCMC material for only the pressure plate or only the flywheel to reduce the cost. However, it must be remembered that the component which remains metal may be susceptible to wear.

Figure 3:
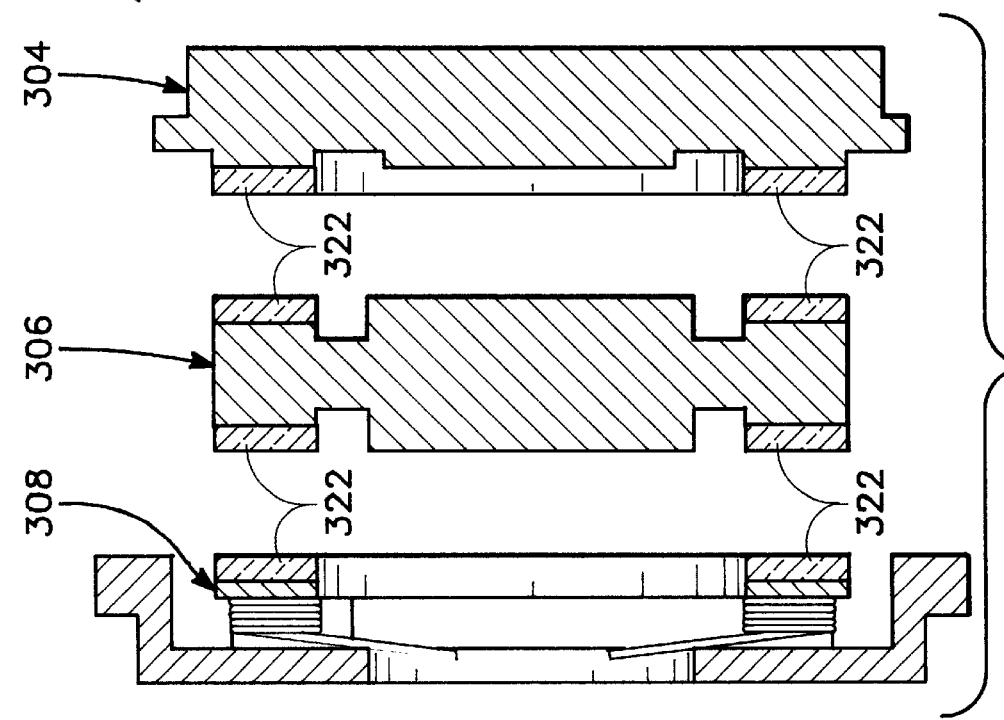
FIG. 3 provides a cross-sectional view of a clutch disk, pressure plate and flywheel employing FRCMC pads made in accordance with the present invention.

In conventional clutch systems, organic or semi-metallic clutch pads are employed which are riveted or bonded to the clutch disk. This same concept could be adapted for use in the present invention, as shown in FIG. 3, by employing the traditional metal clutch components such as the flywheel 304, the pressure plate 306 and the clutch disk 308, but incorporating friction pads 322 on all of the interfacing friction surfaces. These friction pads 322 can be riveted or bonded to the clutch components 304, 306, 308 according to the method used for conventional systems. This would have the advantage, at least in the case of the clutch disk 308, of allowing existing parts to be retrofitted according to the present invention.

Figure 4:
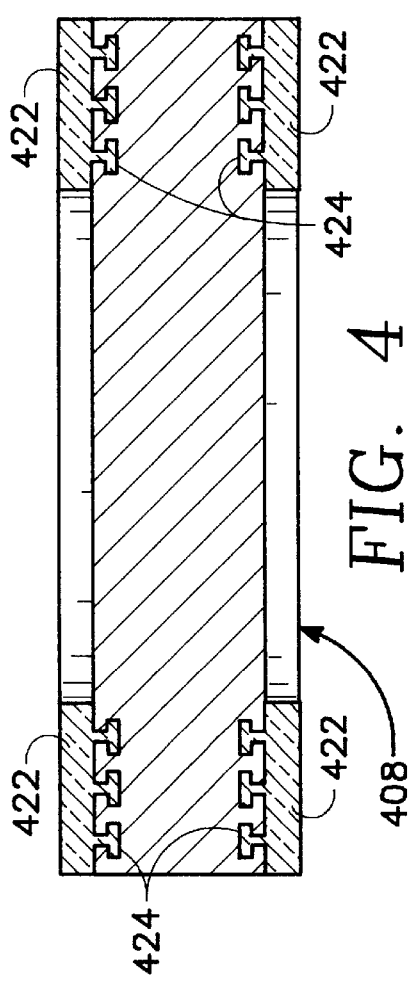
FIG. 4 shows a cross-sectional view of a clutch disk where the FRCMC pads made in accordance with the present invention are cast into the component itself.

In an alternate approach, exemplified by the clutch disk 408 as depicted in FIG. 4, the friction pads 422 are provided with retaining members 424 extending from the rear thereof. Since the friction pads 422 are able to withstand extremes of temperature including that of molten metal, the clutch components can be cast to include friction pads 422. The friction pads 422 would be placed within a mold for the part to be cast and the molten metal would then be poured into the mold and allowed to harden. The finished part is then removed and machined or otherwise finished as necessary.

Figure 5:
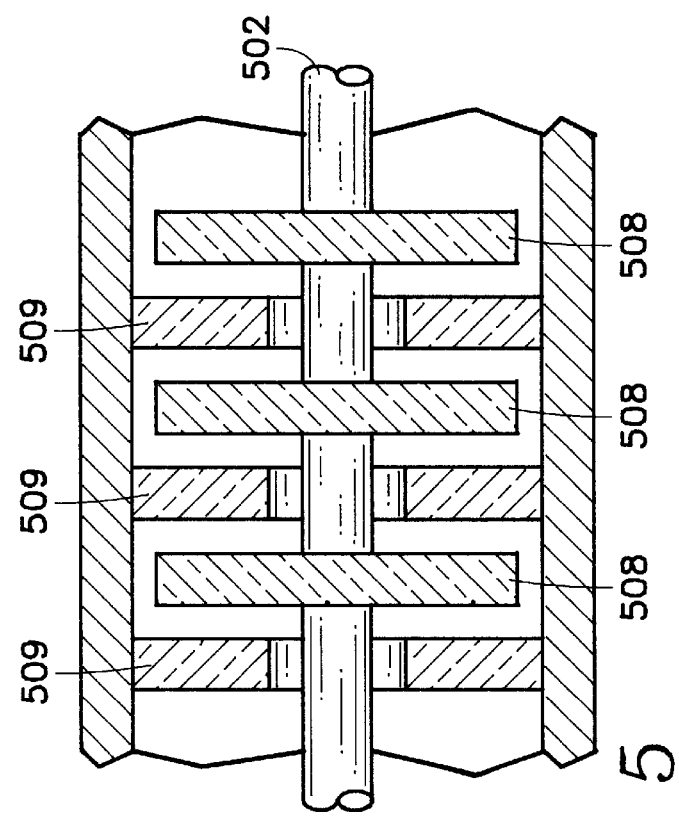
FIG. 5 provides a cross-sectional view of a series of clutch disks attached to a drive shaft of a motorcycle disposed between another series of clutch disks attached to a housing.

Although the present invention has been described in connection with a single dry plate type clutch system typically employed in automobiles and trucks, it is not limited to this type of clutch. Rather the frictional clutch components of any kind of clutch (either in their entirety or employing "friction pads") can be made of the FRCMC material described herein. For example, the present invention can be adapted for a clutch assembly having a series of interlaced clutch disks, such as in the clutch of a motorcycle. As shown in FIG. 5, a series of clutch disks 508 attached to a drive shaft 502 of a motorcycle are dispersed between another series of clutch disks 509 attached to a housing. The drive shaft 502 is connected to the motor and the housing (attached to a chain or belt to propel the motorcycle's rear wheel). The clutch's disks 508, 509 are pressed together, typically by a mechanical spring to drive the wheel of the motorcycle. The spring force can be overcome by a clutch release mechanism thereby allowing the respective clutch disks to 508, 509 to spin independent of one another and thereby allow the engine to keep running without driving the motorcycle.

While the invention has been described in detail by specific reference to preferred embodiments thereof, it is understood that variations and modifications thereof may be made without departing from the true spirit and scope of the invention. For example, other clutch mechanisms also can be adapted to include the present invention. These include, but are not limited to, internal expanding rim clutches, external contracting rim clutches, band-type clutches and cone clutches. Also, it may be possible to coat the clutch components with the wear and friction resistant material described herein, rather than incorporating it into the component themselves. Finally, the proposed clutch components could be used in both wet or dry clutch configurations.

Wherefore, having thus described the present invention, what is claimed is:

1. A clutch mechanism comprising:
   at least one clutch component having at least one friction surface thereof formed of a structural fiber reinforced ceramic matrix composite material comprising fibers coated with an interface material, a polymer-derived resin in its ceramic form, and an erosion-resistant/friction-inducing material.

2. The clutch of claim 1 wherein:
   said polymer-derived ceramic resin is chosen from silicon-carboxyl resin, or alumina silicate resin.

3. The clutch of claim 1 wherein:
   said fibers comprise at least one of alumina, Nextel 312, Nextel 440, Nextel 510, Nextel 550, silicon nitride, silicon carbide, HPZ, graphite, carbon, and peat.

4. The clutch of claim 1 wherein:
   said interface material comprises at least one 0.1–5.0 micron thick layer of at least one of carbon, silicon nitride, silicon carbide, and boron nitride.

5. The clutch of claim 1 wherein:
   said erosion-resistant/friction-inducing material comprises at least one of alumina, mullite, silica, silicon carbide, titania, silicon nitride, and boron nitride.

6. The clutch of claim 5 wherein:
   said total amount of erosion-resistant/friction-inducing material comprises up to about 60 percent by volume of the structural fiber reinforced ceramic matrix composite material.

7. The clutch of claim 1 wherein:
said erosion-resistant/friction-inducing material is at least one of alumina and silicon carbide, and comprises a total of approximately 30 percent by volume of the structural fiber reinforced ceramic matrix composite material.

8. The clutch of claim 1 wherein additionally:
said fibers adjacent each friction surface are disposed along at least one of circular arc segments and radial lines with respect to a center of rotation of the clutch disk.

9. The clutch of claim 1, wherein:
said erosion-resistant/friction inducing material is disposed throughout said clutch component.

10. The clutch of claim 1, wherein:
said erosion-resistant/friction-inducing material is disposed only adjacent to the friction surfaces of said clutch component.

11. The clutch of claim 1 wherein:
said clutch components are a flywheel, pressure plate and clutch disk.

12. The clutch of claim 11 wherein:
the entire clutch disk is made from said structural fiber reinforced ceramic matrix composite material, whereas the flywheel and pressure plate are made from metal.

13. The clutch of claim 11 wherein:
the entire clutch disk and flywheel are made from said structural fiber reinforced ceramic matrix composite material, whereas the pressure plate is made from metal.

14. The clutch of claim 11 wherein:
the entire clutch disk and pressure plate are made from said structural fiber reinforced ceramic matrix composite material, whereas the flywheel is made from metal.

15. The clutch of claim 11 wherein:
the clutch disk, flywheel and pressure plate are made entirely from said structural fiber reinforced ceramic matrix composite material.

16. The clutch of claim 1 wherein:
said clutch components are a plurality of interlacing clutch disks.

17. A clutch mechanism comprising:
a) clutch components formed of metal; and,
b) a plurality of clutch friction pads disposed on adjacent surfaces of said clutch components, said plurality of clutch friction pads being formed of a structural fiber reinforced ceramic matrix composite material comprising fibers coated with an interface material, a polymer-derived resin in its ceramic form, and an erosion-resistant/friction-inducing material.

18. The clutch of claim 17 wherein:
said polymer-derived ceramic resin is chosen from silicon-carboxyl resin, or alumina silicate resin.

19. The clutch of claim 17 wherein:
said fibers comprise at least one of alumina, Nextel 312, Nextel 440, Nextel 510, Nextel 550, silicon nitride, silicon carbide, HPZ, graphite, carbon, and peat.

20. The clutch of claim 17 wherein:
said interface material comprises at least one 0.1–5.0 micron thick layer of at least one of carbon, silicon nitride, silicon carbide, and boron nitride.

21. The clutch of claim 17 wherein:
said erosion-resistant/friction-inducing material comprises at least one of alumina, mullite, silica, silicon carbide, titania, silicon nitride, and boron nitride.

22. The clutch of claim 4 wherein:
said total amount of erosion-resistant/friction-inducing material comprises up to about 60 percent by volume of the structural fiber reinforced ceramic matrix composite material.

23. The clutch of claim 17 wherein:
said erosion-resistant/friction-inducing material is at least one of alumina and silicon carbide, and comprises a total of approximately 30 percent by volume of the structural fiber reinforced ceramic matrix composite material.

24. The clutch of claim 17 wherein additionally:
said fibers adjacent each friction surface are disposed along at least one of the circular arc segments and radial lines with respect to a center of rotation of the clutch disk.

25. The clutch of claim 17, wherein:
said erosion-resistant/friction-inducing material is disposed throughout said friction pad.

26. The clutch of claim 17, wherein:
said erosion-resistant/friction-inducing material is disposed only adjacent to the friction surfaces of said friction pad.

27. The clutch of claim 17 wherein:
said plurality of friction pads are mechanically fastened to said adjacent surfaces of said clutch components.

28. The clutch of claim 17 wherein:
said plurality of friction pads have retaining members extending therefrom and are attached to said adjacent surfaces of said clutch components by said retaining members being disposed within the metal of said clutch component.

29. The clutch of claim 17 wherein:
said clutch components are a flywheel, pressure plate and clutch disk.

30. The clutch of claim 17 wherein:
said clutch components are a plurality of interlacing clutch disks.

31. A clutch friction pad, comprising:
a first portion adjacent a frictional surface of the pad and a second portion forming the remainder of the pad, wherein at least the first portion is formed of a structural fiber reinforced ceramic matrix composite material comprising fibers coated with an interface material, a polymer-derived resin in its ceramic form, and an erosion-resistant/friction-inducing material.

32. The clutch friction pad of claim 31 wherein:
said polymer-derived ceramic resin is chosen from silicon-carboxyl resin, or alumina silicate resin.

33. The clutch friction pad of claim 31 wherein:
said fibers comprise at least one of alumina, Nextel 312, Nextel 440, Nextel 510, Nextel 550, silicon nitride, silicon carbide, HPZ, graphite, carbon, and peat.

34. The clutch friction pad of claim 31 wherein:
said interface material comprises at least one 0.1–5.0 micron thick layer of at least one of carbon, silicon nitride, silicon carbide, and boron nitride.

35. The clutch friction pad of claim 31 wherein:
said erosion-resistant/friction-inducing material comprises at least one of alumina, mullite, silica, silicon carbide, titania, silicon nitride, and boron nitride.

36. The clutch friction pad of claim 35 wherein:
said total amount of erosion-resistant/friction-inducing material comprises up to about 60 percent by volume of the structural fiber reinforced ceramic matrix composite material.

37. The clutch friction pad of claim 31 wherein:

said erosion-resistant/friction-inducing material is at least one of alumina and silicon carbide, and comprises a total of approximately 30 percent by volume of the structural fiber reinforced ceramic matrix composite material.

38. The clutch friction pad of claim 31 wherein additionally:

said fibers adjacent each friction surface are disposed along at least one of circular arc segments and radial lines with respect to a center of rotation of the clutch disk.

39. The clutch friction pad of claim 31, wherein:

said erosion-resistant/friction-inducing material is disposed throughout said clutch friction pad.

40. The clutch friction pad of claim 31, wherein:

said erosion-resistant/friction-inducing material is disposed only adjacent to the friction surfaces of said friction pad.

41. The clutch pad of claim 31 wherein additionally:

the clutch pad includes means for mechanically fastening it to a clutch component.

42. The clutch pad of claim 31 wherein:

the clutch pad includes retaining members extending therefrom for attaching the clutch pad to a clutch component by casting said retaining members into a metal comprising said clutch component.

* * * * *